United States Patent [19]

Coffey et al.

[11] Patent Number: 5,481,299
[45] Date of Patent: Jan. 2, 1996

[54] POWER SAVING DEVICE FOR VIDEO SCREEN

[76] Inventors: Lawrence G. Coffey, 631 Stemel Ct., Milpitas, Calif. 95035; Steve B. Verity, 2201 Monroe St. #1408, Santa Clara, Calif. 95051

[21] Appl. No.: 243,225

[22] Filed: May 16, 1994

[51] Int. Cl.⁶ .................................................. H04N 5/222
[52] U.S. Cl. ...................... 348/123; 348/730; 348/633; 345/212; 395/750
[58] Field of Search ....................... 348/173, 730, 348/532, 633, 634, 682; 395/750, 375, 500; 345/76, 212; 364/237.2–237.3, 927, 927.5, 948.4, 943.43, 707; 307/273.3; H04N 5/222

[56] References Cited

U.S. PATENT DOCUMENTS 4,525,710  6/1985  Hoshi et al. ........................ 340/484
4,590,553  5/1986  Noda ................................. 364/200
4,698,679  10/1987  Balaban et al. ..................... 348/532
4,837,623  6/1989  Motoyama ......................... 348/633
4,970,408  11/1990  Hanke et al. ....................... 307/272.3
5,059,961  10/1991  Chen ................................. 340/720
5,375,245  12/1994  Solhjell et al. .................... 395/750
5,389,952  2/1995  Kikinis .............................. 345/212

*Primary Examiner*—James J. Groody
*Assistant Examiner*—Glenton B. Burgess

[57] ABSTRACT

A system for saving power used by a video screen including a comparator comparing the red, green blue signals to a reference signal and when all of these signals fall below a reference signal and stay below the reference signal for a preset period of time, power to the video monitor is interrupted until the red, blue or green signals are restored. When the power is applied, power is maintained during a stabilizing period.

9 Claims, 6 Drawing Sheets

| | | | |
|---|---|---|---|
| 1 | 1 | C1 | 1 uF |
| 2 | 1 | C2 | 1000uF |
| 3 | 13 | CU1,CU2,C3,CU3,C4,CU4,<br>CU5,CU6,C7,CU7,C8,CU8,C9 | 0.1uF |
| 4 | 1 | C6 | 470uF |
| 5 | 5 | D1,D2,D3,D4,D5 | DIODE |
| 6 | 2 | D6,D7 | 1N4148 |
| 7 | 1 | FU1 | FUSE |
| 8 | 2 | J1,J8 | CONN-HDB15 |
| 9 | 1 | J2 | JMP3 |
| 10 | 1 | J3 | HEAD13X2 |
| 11 | 1 | J4 | HEAD3X2 |
| 13 | 1 | J9 | HEAD4 |
| 14 | 1 | LED1 | LED |
| 15 | 1 | PLG1 | PLUG-4 |
| 16 | 1 | R1 | 270 |
| 17 | 1 | R3 | 10K |
| 18 | 9 | R4,R5,R6,R11,R12,R20,R21,<br>R22,R23 | 2.2K |
| 19 | 1 | R7 | 100 |
| 20 | 1 | REL1 | RELAY |
| 21 | 1 | SKT1 | 120IN |
| 22 | 1 | SKT2 | 120OUT |
| 23 | 1 | SW1 | SWITCH |
| 24 | 1 | U2 | CD4020 |
| 25 | 1 | U3 | 74C14 |
| 26 | 1 | U4 | 74C02 |
| 27 | 1 | U5 | 74C00 |
| 28 | 2 | U6,U7 | 74C74 |
| 29 | 1 | U8 | 4N25AQT |
| 30 | 1 | U10 | 74F74 |
| 31 | 1 | U11 | 74F27 |
| 32 | 3 | U12,U13,U14 | LM1881 |
| 34 | 1 | VR1 | 78L05 |
| 35 | 1 | X1 | XFORM |

FIG. 3

POWER SAVING DEVICE FOR VIDEO SCREEN

BACKGROUND

1. Field of the Invention

This invention is related to devices that conserve power and particularly to a circuit module that monitors the video signal and turns off power to the monitor when the monitor is not in use.

2. Prior Art and Information Disclosure

Various cirtcuits for conserving power have been disclosed which have general application.

For example, U.S. Pat. No. 4,970,408 to Hanke et al is for a CMOS power-on reset circuit whose output signal changes state upon detecting a predetermined threshhold of the power supply voltage during the startup transient then activates an inverter to substantially reduce the current through the power reset circuit to save power consumption.

U.S. Pat. No. 4,590,553 to Noda is for a microcomputer which is set to a power-save mode by an external signal and is provided with a flip-flop circuit for issuing a power save signal which is set when the microcomputer is set to a power save mode and reset upon receipt of a reset signal.

A number of devices are currently in or about to enter the market place for conserving power to computer circuits.

The "Monitor Miser" is a power saving module distributed by Technical Marketing partners in Mountain View, Calif. The Monitor Miser monitors keyboard activity and is connected between the keyboard and the CPU. When there is no activity for a user-specified period of time, Monitor Miser turns off the monitor. Then, when any key is touched, the monitor is turned back on.

"Powerkey" is a module produced by Sophisticated Circuits, Inc. Bothell, Wash. for the Macintosh. It is plugged into the Macintosh via an ADB port (Apple Desktop Bus). It has four outlet ports which turn on or off together under software control. The module can be programmed to turn the outlets on or off at preset times or by a phone call.

The Smartbar is a module produced by Sequence Electronics in Ontario Canada. The module has one connection to the keyboard and a second connection to a serial communications port. The Smartbar can be programmed to turn off after the keyboard has been inactive for a user-specified period of time. and can be instructed not to shut down if there are open files.

None of the devices available provide an inexpensive means for conserving power in response to detection of dormant periods where there is no video signal. Furthermore, the available power saving systems generally are constructed for use on specific brands of systems and require connection to ports of the system.

THE INVENTION

Objects

It is an object of this invention to provide a module for conserving power used in operating the video monitor wherein the video monitor is part of any one of a number of systems including Macintosh, IBM, etc.

It is another object that the module not use PC resources such as serial ports, ADB ports or PC expansion slots.

It is another object that the module have a simple construction and be convenient to install without requiring multiple hookups.

SUMMARY

This invention is directed toward a module connected in the transmission line between a host system and a monitor which monitors the video signal and discontinues power to the monitor when the video signal is dormant for a predetermined period of time.

The system uses a sync separator to separate the red green and blue video signals from the sync signal and then uses an analog comparator to compare the three signals (red, green, blue) to a locally generated reference signal. If all of the red, green blue signals are low with respect to the reference signal, then a counter begins a count and if the count reaches a preset value, a state machine, responsive to the end of count, activates a relay which switches off power to the monitor. When the video signal is restored, the counter is reset and the state machine closes the relay switch thereby restoring power to the monitor. The circuit also features a reset circuit such that when power is first switched on or reset, the counter reset is held high to give the system an opportunity to stabilize.

BRIEF DESCRIPTION OF THE DRAWINGS

FIG. 3 is a parts list for the circuit of FIGS. 2A and 2B

DESCRIPTION OF THE BEST MODE

Figure 1:
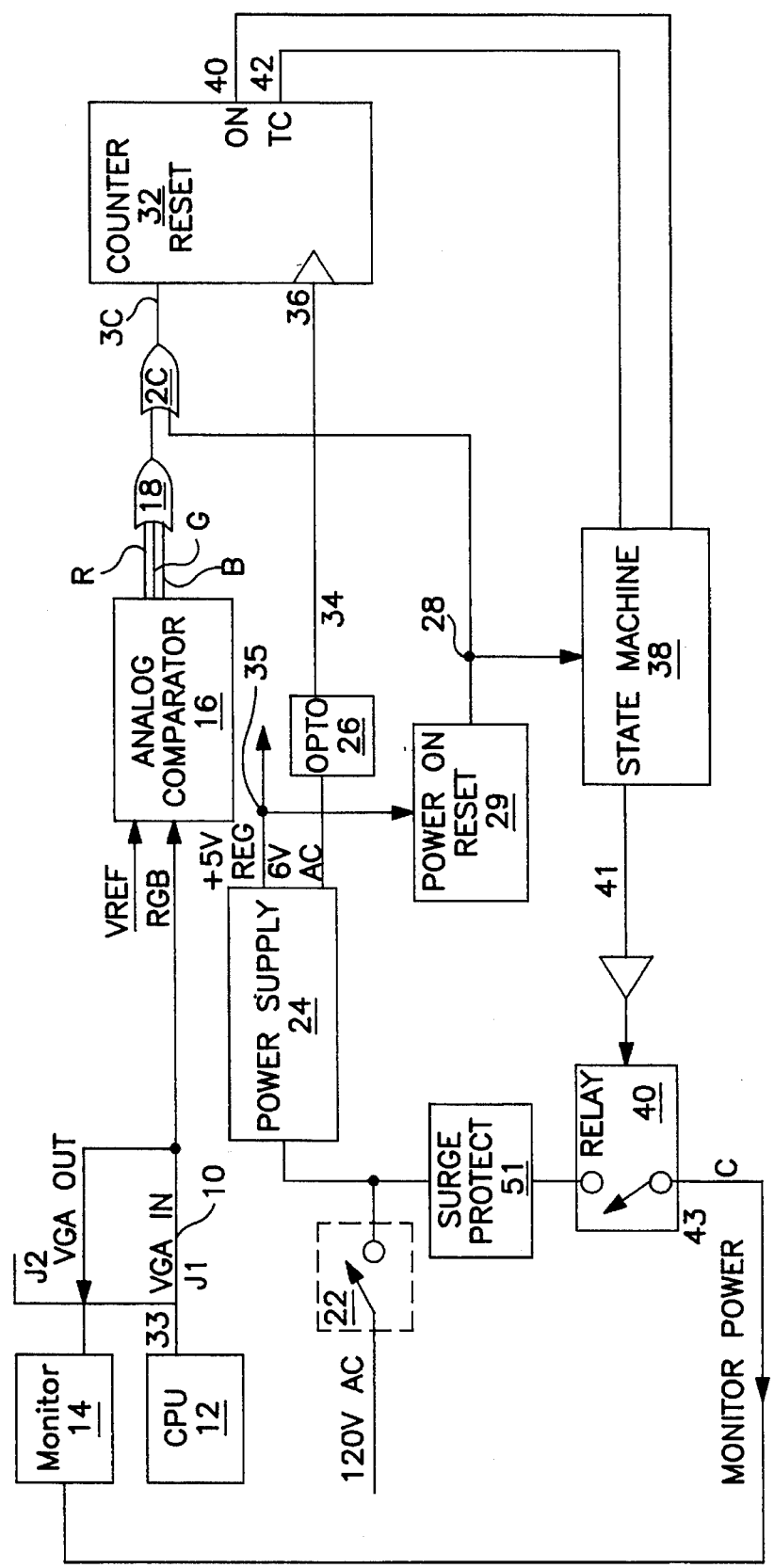
FIG. 1 is a schematic block diagram of one embodiment of the invention.

Turning now to a discussion of the drawings, the parts in the drawings indicated by the item numbers are listed as follows:

10 VGA input line
12 CPU
14 video monitor
16 comparator
18 OR logic gate
20 output of OR logic gate
22 Power switch
24 Power supply
26 Power on reset
27 Opto signal oscillator
28 output of power on reset
30 output of OR gate 20
32 counter
34 Opto output line
36 data terminal of counter FIG. 1 is a block diagram showing the various parts of the power saving circuit of this invention. There is shown a VGA signal input on line 10 from a CPU 12 (central processing unit) to a video monitor 14. The RGB signals (red, green, blue) are input to a comparator 16 where each of the three siganls are compared to a reference signal (Vref). Comparator outputs R, G, B are input to OR logic gate 18 so that output of OR logic gate 20 is high if either one of R, G, B is high.

When power switch 22 is first turned on Power supply 24 powers up and during the powering up stage, the output 28 of power on reset 26 goes high and is input to OR logic gate 20.

Therefore the output 30 of OR logic gate 20 goes high if either, the power is first turned on or if there is a signal R, G, or B so that counter 32 is continually reset under any of these conditions.

The power supply 24 also activates a clock signal from opto oscillator 26 which applies a 60 cps clock signal on line 34. The clock signal is input to the data terminal 36 however counter 32 will not count while the reset terminal from OR gate 20 is high as discussed above.

After the power on reset has stabilized (reached full voltage) output 28 from power on reset goes low. Then, if all of R, G, B signals are interrupted, reset 30 on counter 32 will go low and counter 32 will signal state machine 40 to begin counting clock pulses from line counter line 40. This corresponds to the required function that the power to the monitor will not be shut off immediately when the R,G, B signal is interrupted but only after a specified period of time. When the counts to statemachine 38 reaches the predetermined value, state machine 38 energizes relay 41 to interrupt power to the monitor 14.

Once the video signal resumes, the power to the monitor is restored 14

Surge protector 51 between the power in plug 46 and relay 41 protects relay 41..

Figure 2A:
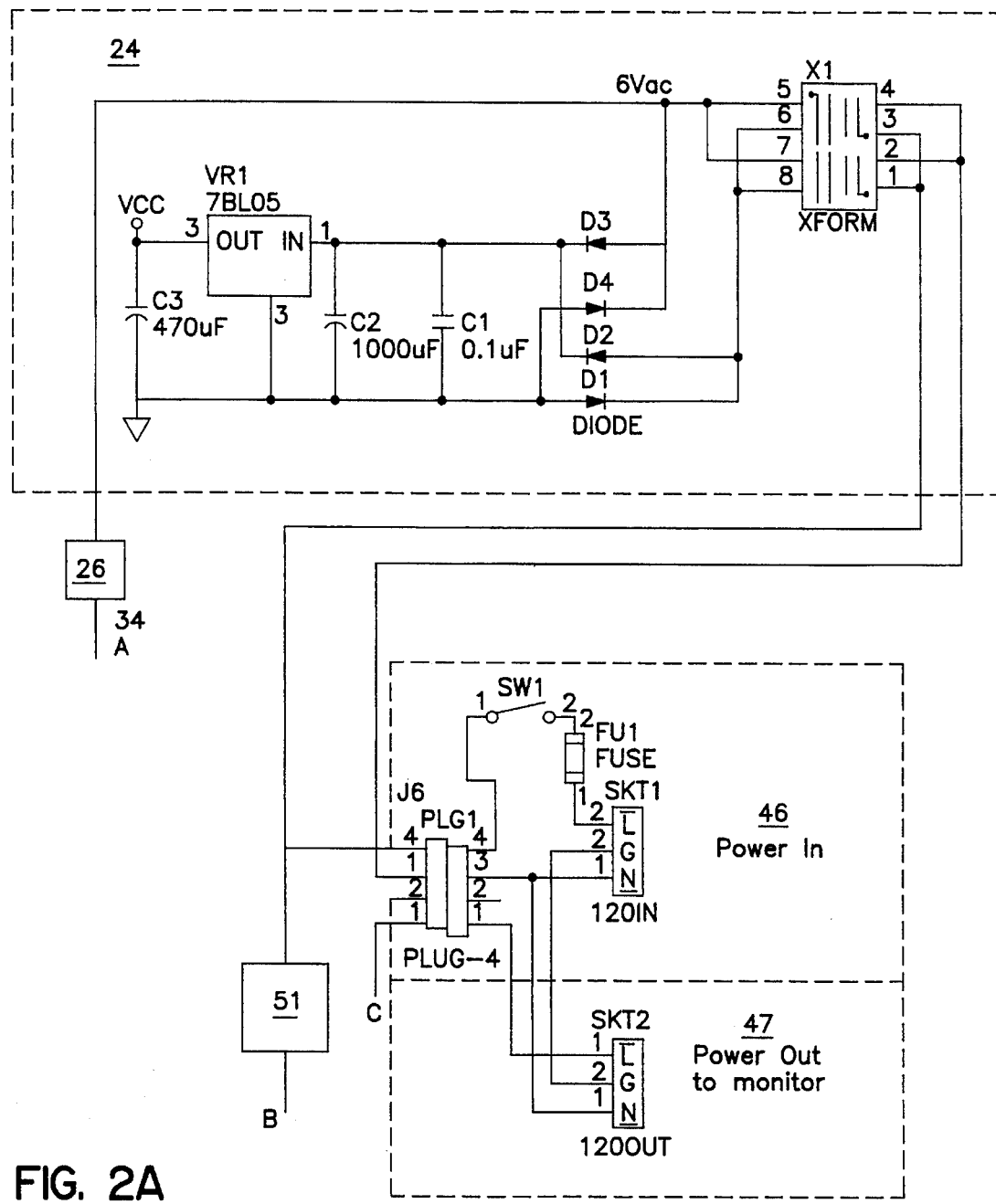
FIGS. 2A, 2B and 2C are detailed circuits of FIG. 1
Figure 2B:
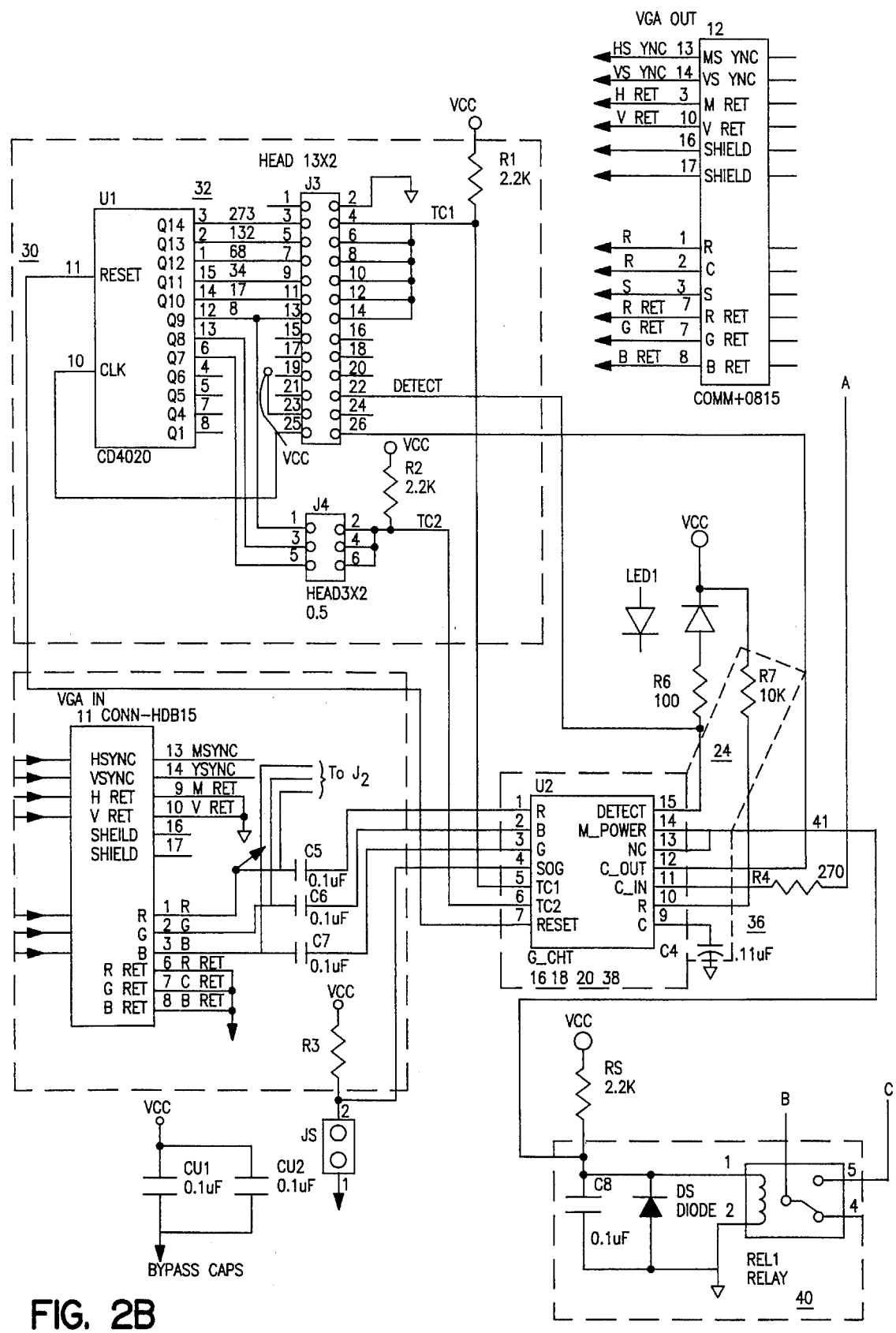
Figure 2C:
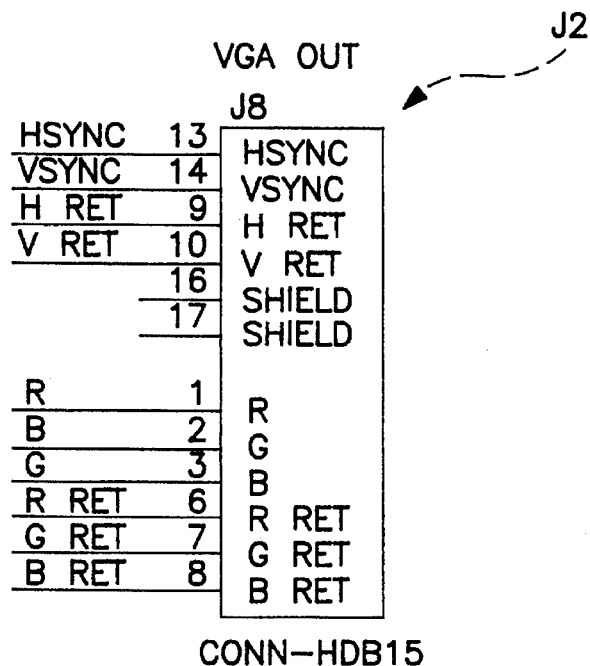
Figure 2C:
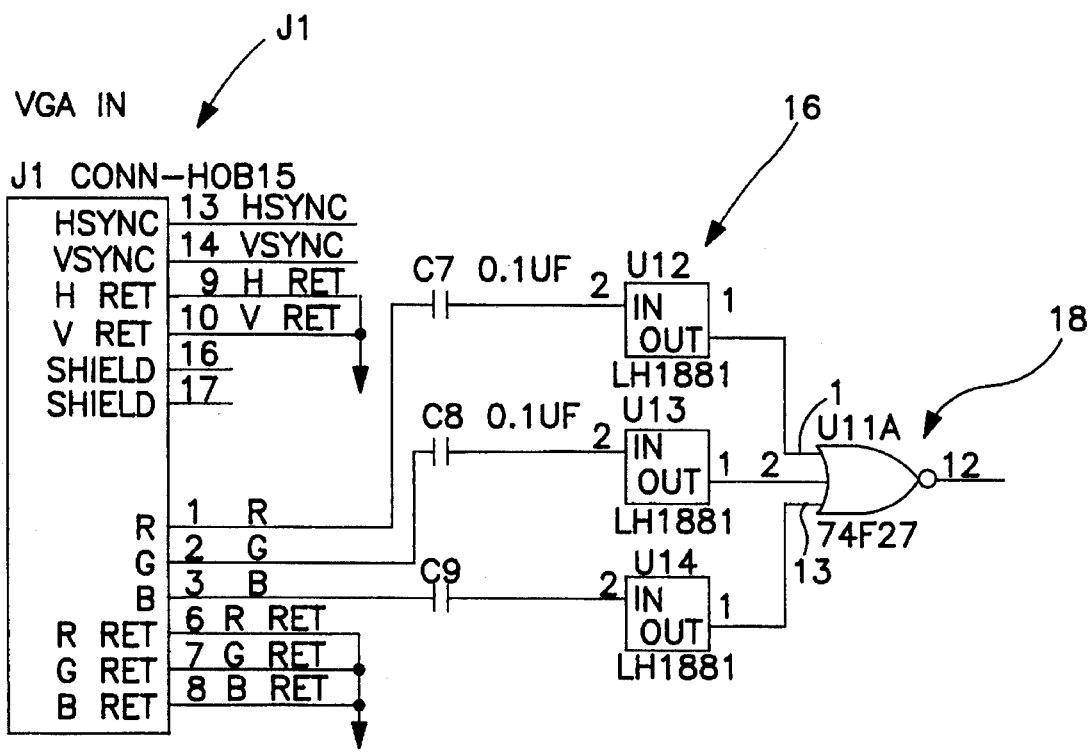

FIGS. 2A and 2B show the circuit sections in more detail. In FIG. 2A, there are shown the power in plug 46 and power plug 47 out to the monitor. The power supply section 24 generates Vcc and 6 V to the opto clock 26. FIG. 2B shows section U1 as an ASIC including comparator 16, logic OR gates 18 and 20 and the state machine 20 for detecting end of count. The clock signal on line 34 is input to the clock line of U2 which includes counter 32 and state machine 28. The power on reset timing circuit 29 is shown as R7 and C4. Reset output from pin 7 of U2 is input on line 30 to counter 32. VGA IN signal input line 33 from the CPU 12 is shown as plug J1 in FIG. 2B. VGA OUT to the monitor is connected via plug J2 to plug J1. Red, Green and Blue signals (R,G,B,) also go to comparator pins 1, 2, 3 on chip U2 16. When end of count signal Tc1 is detected on pin 5 of U2, (38) pin 14 (41) goes high energizing relay 40 and cutting power on line C to monitor connection SKT 2. FIG. 2C shows in place of the ASIC shown in FIG. 2B, implementation of the comparator function using discrete components including comparators 16 and OR gate 18.

FIG. 3 is a parts list for the circuit of FIG. 2A and 2B.

Figure 4:
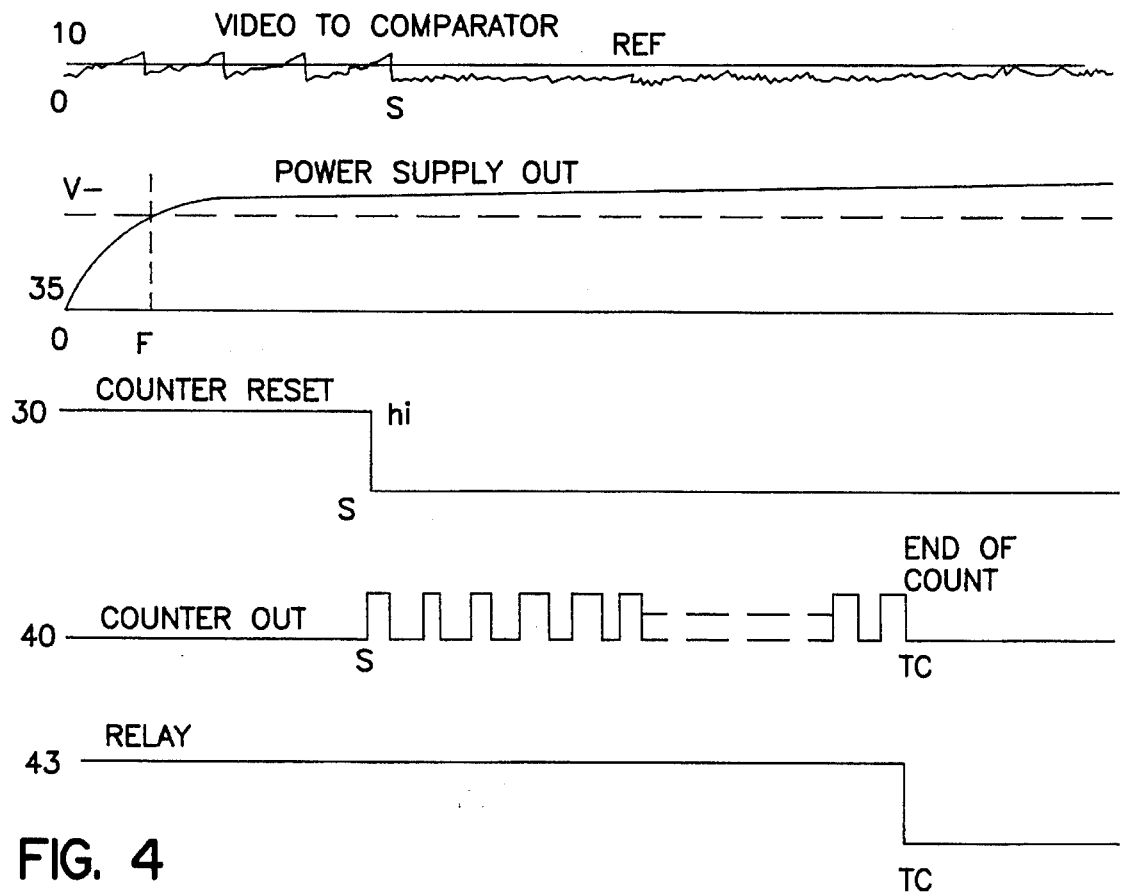
FIG. 4 is a timing diagram showing signals at key loctions.

FIG. 4 is a timing diagram showing signals at key locations in the circuit. Line 10 shows a video signal which is interrupted at time t=s.

Line 35 shows the power supply voltage turned on at t=0 and exceeding a threshhold voltage Vt at time t=F.

Line 30 shows counter rest line 30 as being high up to time t=s before which time, counter reset 30 is high because of tehe presence of the video signal and/or because the power supply voltage 35 is below threshhold.

Line 40 shows the counter output line 40 which begins to count at time t=s because counter reset 30 has gone low.

Line 48 shows relay line 43 going low after a period Tc because the counter 40 has reached the predeterinined count Tc thereby shutting off power to the monitor.

Figure 5:
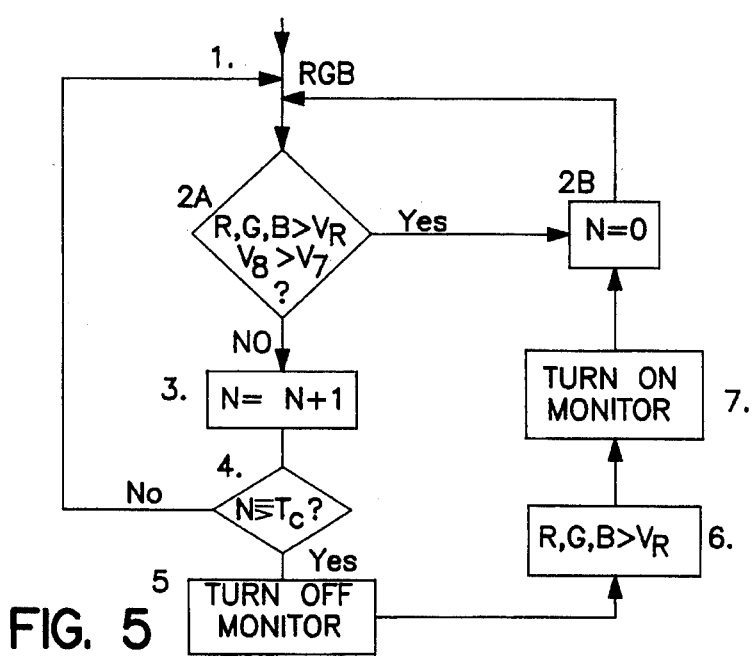
FIG. 5 is a flow shaft listing steps in the method of practicing the invention.

FIG. 5 is a flow chart illustrating the steps in performing the steps of the invenion.

In step 1, video signal RGB is input to the system.

In step 2A, R,G,B is compared to a first reference voltage, Vr, and Vp (power supply voltage) is compared to threshhold volatage Vt. If R,G B is greater than Vr or Vp is less than Vt, a count, N, is set equal to zero in step 2B and control returns to step 1 If step 2A is NO then control advances to step 3

In step 3, count N is increased by integer 1.

In step 4., N is compared to preset end of count Tc. If N is less than Tc, then control returns to step 1. If N=Tc then control advances to step 5 and the monitor is turned off.

In step 5, the monitor is turned off.

In step 6 If RGB is greater than Vr, control is advanced to step 7.

In step 7, the monitor is turned on and control is advanced back to step 2B..

The preferred embodiment illustrates the method for practicing a major feature of the invention which is to monitor the video signal and interrupt power to the monitor when the video signal goes low for a predetermined period of time. Variations to the embodiment may be considered which are within the scope of the invention. For example, the method may be applied to a video signal that is black and white. I therefore wish to define the scope of my invention by the appended claims and in view of the specification if need be.

We claim:

1. A method for conserving power required to operate a video monitor receiving a color video signal which includes the steps:

(a) continuously comparing a level of each color component of a color video signal having red green and blue components input to said monitor to a level of a locally generated reference signal;

(b) if all of said color components of said video signal level falls below said level of said reference signal, measuring the time period that all of said color components of said color video signal is at first less than and continues to be less than said reference voltage;

(c) interrupting power to said monitor when said measured time period exceeds a preset period of time.

2. A method as in claim 1 which includes the step after step (C):

(d) continuing to compare said level of said video signal to said reference signal;

(e) restoring power to said monitor when said level of said video signal exceeds said level of said reference signal;

(f) returning to step (a).

3. A method as in claim 2 wherein step (a) includes the steps:

(i) applying power to a comparator circutit for comparing said reference signal and said video signal;

(ii) comparing power applied to said comparator to a threshhold value of power and when said applied power is less than said threshhold value, repeating step(a) until said applied power exceeds said threshhold value.

4. A method as in claim 1 wherein said video signal is a black and white signal.

5. A system for conserving power applied to a video monitor receiving a color video signal including red, green and blue components which comprises:

means for generating a reference signal having a level;

means connected to said means for generating said reference signal for comparing a level of each red green and blue components of said video signal to said reference signal level and generating a comparator output signal on a comparator output line when each of said red, green and blue components of said color video signal level is less than said reference signal level;

means connected to said comparator output line for emitting a time signal indicating length of a period beginning with an instant when said comparator output signal is first emitted and lasting until said comparator signal is discontinued;

means connected to said time signal emitting means for emitting a power interrupt signal when said time signal indicates a length of said period equal to a predetermined period;

means connected to a power line to said monitor and to said means for emitting said power interrupt signal for interrupting power to said monitor responsive to said power interrupt signal.

6. A system as in claim 5 wherein said means for interrupting power comprises:

a relay controlled switch having switch terminals connected between said monitor and a source of power; coil terminals connected to said means for emitting a power interrupt signal.

7. A system as in claim 5 wherein said means for emitting a time signal comprises:

an opto oscillator having input terminals adapted for connection to a power supply and opto output terminals;

a counter having a reset terminal connected to said comparator output signal and a clock counter connected to said opto output terminals and an output count terminal connected to said means for emitting a power interrupt signal.

8. A system as in claim 5 which comprises a means for applying a reset signal to said means for emitting a time signal when power applied to said system is below a threshhold value, said means for applying a reset signal having an input terminal adapted for connection to a power supply for said system and an output terminal connected to said means for en-fitting a time signal.

9. A system as in claim 5 which comprises a surge protector adapted for connection between a power supply and said relay controlled switch.

* * * * *